(12) United States Patent
Selkirk et al.

(10) Patent No.: US 6,925,528 B2
(45) Date of Patent: Aug. 2, 2005

(54) FLOATING VIRTUALIZATION LAYERS

(75) Inventors: Stephen S. Selkirk, Broomfield, CO (US); Charles A. Milligan, Golden, CO (US); Perry Merritt, Broomfield, CO (US); Edward T. Gladstone, Westminster, CO (US); James B. Lenehan, Erie, CO (US)

(73) Assignee: Storage Technology Corporation, Louisville, CO (US)

( * ) Notice: Subject to any disclaimer, the term of this patent is extended or adjusted under 35 U.S.C. 154(b) by 637 days.

(21) Appl. No.: 09/752,071

(22) Filed: Dec. 29, 2000

(65) Prior Publication Data

US 2002/0087780 A1 Jul. 4, 2002

Related U.S. Application Data

(60) Provisional application No. 60/212,772, filed on Jun. 20, 2000.

(51) Int. Cl.[7] .............................................. G06F 12/08
(52) U.S. Cl. ........................ 711/114; 711/203; 709/216
(58) Field of Search ................................ 711/114, 203; 709/325, 1, 104; 209/216

(56) References Cited

U.S. PATENT DOCUMENTS

| | | | | |
|---|---|---|---|---|
| 5,392,244 A | * | 2/1995 | Jacobson et al. ........... | 711/114 |
| 5,960,451 A | * | 9/1999 | Voigt et al. ................. | 711/114 |
| 6,526,478 B1 | * | 2/2003 | Kirby ......................... | 711/114 |

* cited by examiner

Primary Examiner—Jack A. Lane
(74) Attorney, Agent, or Firm—Yee & Associates, P.C.

(57) ABSTRACT

A virtual stored data management system is provided. In one embodiment, the management system includes one or more hosts and a plurality of data storage elements functionally coupled to the hosts. Each data storage element includes a host network attachment, data transfer means, a storage controller, and permanent data storage media. The permanent data storage media is organized with management information uniquely associated with units of the data such that the management information may be manipulated in several different locations within the management system substantially simultaneously. Thus, the organization of the management processes allows for the management information to be processed, used, changed, or modified in several different locations within the management system at any particular instance. Provision is made for the internal processes to discover the current location of the processing, for the location to be changed as directed, and for the processing to be kept consistent when done in more than one place simultaneously.

22 Claims, 9 Drawing Sheets

FLOATING VIRTUALIZATION LAYERS

CROSS REFERENCE TO PROVISIONAL AND RELATED APPLICATIONS

This application claims the benefit of the filing date of corresponding U.S. provisional Patent Application No. 60/212,772, entitled "System for providing a policy-based demand and use of functions like virtual volumes, instant copy, RAID, etc.", filed Jun. 20, 2000. In addition, the present invention is related to applications entitled SYSTEM TO SUPPORT DYNAMICALLY FLEXIBLE DATA DEFINITIONS AND STORAGE REQUIREMENTS, Ser. No. 09/751,635; APPARATUS AND METHOD FOR DYNAMICALLY CHANGEABLE VIRTUAL MAPPING SCHEME, Ser. No. 09/884,294; USING CURRENT RECOVERY MECHANISMS TO IMPLEMENT DYNAMIC MAPPING OPERATIONS, Ser. No. 09/800,714 now U.S. Pat. No. 6,532,527; DYNAMICALLY CHANGEABLE VIRTUAL MAPPING SCHEME, Ser. No. 09/751,772; RECOVERY OF DYNAMIC MAPS AND DATA MANAGED THEREBY, Ser. No. 09/752,253; and SELF DEFINING DATA UNITS, Ser. No. 09/751,641, which are assigned to the same assignee, and incorporated herein by reference.

BACKGROUND OF THE INVENTION

1. Technical Field

The present invention relates generally to an improved data processing system and in particular to a data storage subsystem for use with a data processing system. Still more particularly, the present invention provides a method for virtualization processes to execute in multiple locations simultaneously and to be moved from location to location thus improving system performance or ease of use.

2. Description of Related Art

Today's storage administrator is faced with many unique storage problems not prevalent a few years ago. Storage administrators in the past were typically faced with managing storage from a single host vendor. Today's storage administrator is faced with several different host platforms—multiple flavors of Unix and NT with many storage solutions attached to those hosts. Even if the administrator has selected a primary storage vendor, disk and controller technology have changed rapidly and frequently in the last few years. Three years ago, a redundant array of independent disks (RAID) controller attached to 20-megabyte SCSI with 20 2-gigabyte drives was state of the art. Today, vendors attach controllers with twice as many 36-gigabyte drives via 1-gigabit Fibre channel. The problems become "How do I manage this new storage effectively?", "How do I protect my investment?", and "How will I manage all of this and more in the future?"

In addition to having to deal with multiple vendors with multiple products, the administrator is faced with a myriad of management issues. With today's larger drives combined with Redundant Array of Independent (RAID) binding, the administrator is faced with partitioning very large devices to meet the storage needs of the system attached to them. A 140 GB volume is not uncommon in today's systems. Providing subsets of large storage pools becomes a problem.

In keeping with the notion of systems presenting very large volumes, how is the administrator able to divide that storage across multiple host? It also may be desirable to share the storage on a single storage device across multiple hosts.

In a site with multiple hosts and multiple storage devices, configuration software may also become an administrative issue. Each storage vendor provides tools that allow an administrator to configure device attached to a particular host. There may be as many configuration tools as there are hosts and storage systems attached to them.

In sites that have hosts and storage devices attached to a Fibre Channel loop, there is the problem of "How do I keep Host 1 from accessing and possibly restoring the data allocated to Host 2?" In this type of configuration, all of the hosts see all of the devices and believe they have access to them. An additional challenge faced by administrators is the fact that there are often many unaligned sets of users and authorization for specific users to access or change data is a concern which is a challenge exasperated by the problems discussed above.

Therefore, it would be advantageous to have an improved method and apparatus for managing a storage system that protects data from being lost while providing ease of incorporation of products from various vendors.

SUMMARY OF THE INVENTION

The present invention provides a virtual stored data management system. In one embodiment, the management system includes one or more hosts and a plurality of data storage elements functionally coupled to the hosts. Each data storage element includes a host network attachment, data transfer means, a storage controller, and permanent data storage media. The permanent data storage media is organized with management information uniquely associated with units of the data such that the management information may be manipulated at nodes that are in several different locations within the management system substantially simultaneously. Thus, the organization of the management processes allows for the management information to be processed, used, changed, or modified at nodes that are in several different locations within the management system at any particular instance. Provision is made for the internal processes to discover the current location of the processing, for the location to be changed as directed, and for the processing to be kept consistent when done in more than one place simultaneously.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
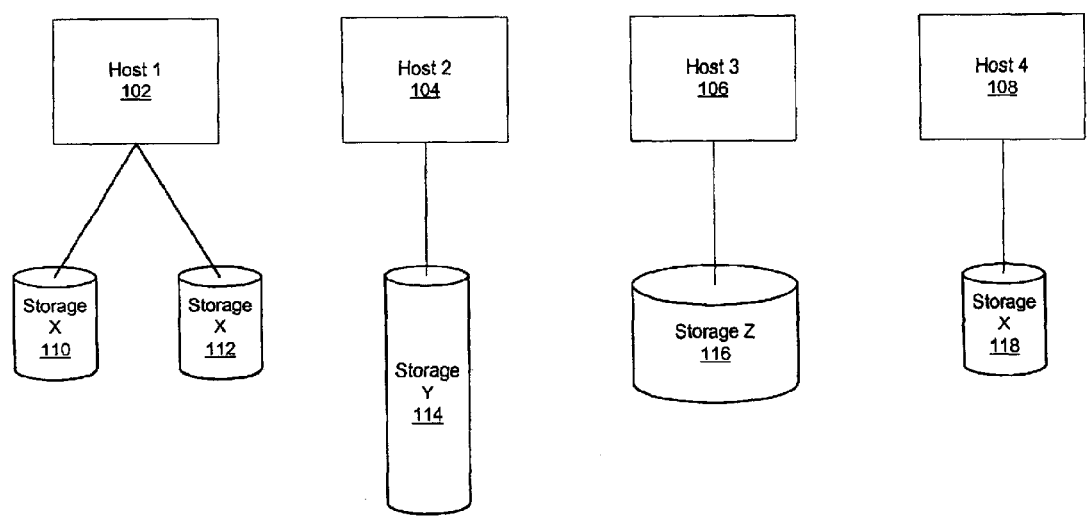
FIG. 1 depicts a typical storage configuration according to the prior art.

With reference now to the figures, FIG. 1 depicts a typical storage configuration according to the prior art. The site has several different hosts 102–108, each with dedicated storage 110–118 attached to it. The storage 110–118 has been purchased from different vendors at different times. Each of these hosts 102–108 has different management tools and cannot share storage 110–118 with the other hosts 102–108 as they need it.

Figure 2:
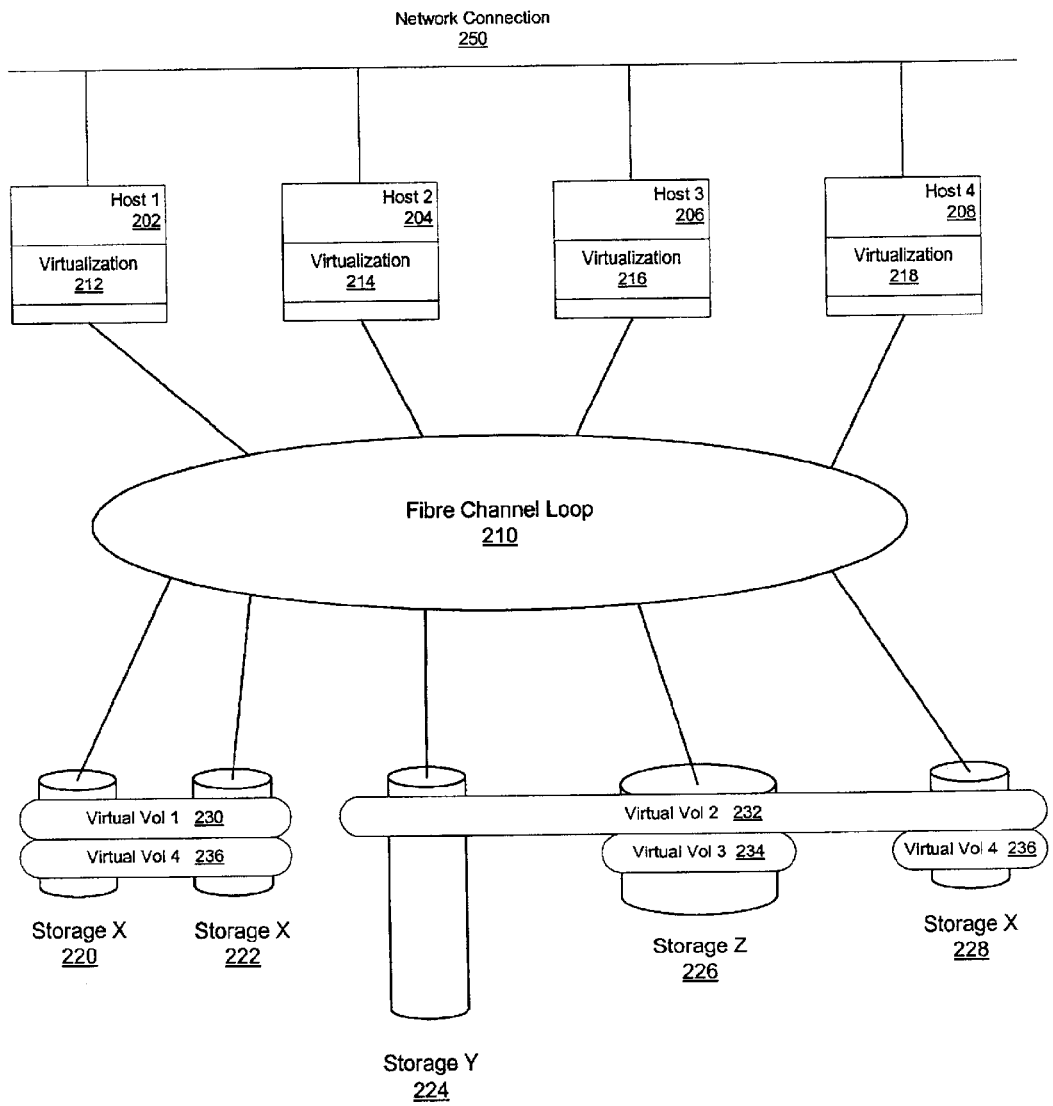
FIG. 2 depicts a block diagram illustrating an example of a virtualized storage environment that includes several hosts sharing storage across a number of storage devices in accordance with a preferred embodiment of the present invention.

With reference now to FIG. 2, a block diagram illustrating an example of a virtualized storage environment that includes several hosts sharing storage across a number of storage devices is depicted in accordance with a preferred embodiment of the present invention. The physical devices 220–228 are treated as a pool of storage that may be carved up and assigned to individual hosts 202–208 as needed. Host-based virtualization (separating the user and physical views of the storage devices) provides this capability. In the depicted example, the virtual volume names 230–236 relate to the hosts 202–208 to which those volumes 230–236 are assigned (e.g., Virtual Volume 1 230 is assigned to Host 1 202).

Three things have been added to convert the storage environment as depicted in FIG. 1 to the virtual environment depicted in FIG. 2. First, a Fibre Channel loop 210 has been added to allow each host to be physical attached to each storage system. A loop 210 is shown for the sake of simplicity. However, alternatively, other devices could be used as well, such as, for example, a hub or an intelligent switch or the Access Controller functions available in the SN6000, a product available from Storage Technology Corporation of Louisville, Colo. The second change is the addition of a network connection 250 between each of the hosts. Finally, the third element is the inclusion of virtualization software 212–218 on each host.

The virtualization software 212–218 is made up of two primary components: a management and a virtualization device driver. The network connection 250 is used by the management application to communicate configuration changes to each of the other management applications and to provide a convenient interface to a separate user interface (UI) tool.

The combination of the two software components masks the physical devices 220–228 from each of the host operating systems and replaces them with virtual images appropriate to the individual host. Virtual images may be created across any subset and combination of physical devices 220–228. This allows the system administrator to "create" the storage each host needs in its appropriate form. In FIG. 2, virtual volumes 230–236 are assigned to multiple devices and to a single device. The virtual volumes are also shown as a subset of each of the devices 220–228.

Devices 220–228 may be selected to participate in a virtual volume 230–236 through any number of criteria: cost, performance, protection level, or available capacity.

A walkthrough of the life cycle of a virtual volume 230–236 helps to explain how virtualization is accomplished. As physical devices 220–228 are attached to the Fibre Channel loop 210, they are discovered by the host 202–208 operating systems. These devices 220–228 may then be placed under the control of the virtualization software through the management application. When this is done, the physical devices are no longer accessible by the host 202–208 operating system, thus masking them from view. The physical device 220–228 is added to the pool of storage devices 220–228 from which virtual volumes 230–236 may be assigned. The system administrator may then interface to the management software, through the user of a UI tool, to create a new virtual volume. The virtual volume is created based on parameters provided by the administrator. Those parameters include size and which hosts have access to the virtual volume. Other parameters may include preferences such as performance and reliability characteristics or cost of storage. Finally, the administrator may actually select which physical devices 220–228 will participate in the virtual volume 230–236 and how much of the virtual volume 230–236 will reside on any given physical device 220–228.

The creation of a virtual volume 230–236 and assignment of which physical devices participate in the virtual volume may also occur without human intervention by means of an application program interface (API). A host 202–208 application or operating system may request more storage and the management application provide the storage requested via this API.

Once the virtual volume 230–236 is created, the management application attached to the UI broadcasts the new configuration information to each of the other management applications in the environment. Each of the management applications saves a copy of the new configuration to persistent storage. Each of the hosts 202–208 to which the virtual volume 230–236 is assigned then downloads the relevant information to the virtualization driver. At this point, the virtualization driver is able to present the virtual volume 230–236 to the host 202–208 as a physical device 220–228 that the host 202–208 may then user as it pleases.

The virtualization driver's primarily responsibility is now to route requests made to the virtual volume 230–236 to the actual physical locations of the data. The driver is also responsible for presenting appropriate completion status to the host 202–208 operating system.

When a virtual volume 230–236 is removed, the application manager updates the configuration information to indicate the newly available physical space and broadcasts the changes to the other management applications. The management application on each of the hosts 202–208 to which the virtual volume 230–236 was assigned now remove the virtual volume 230–236 from the host 202–208 operating system view and download the changes to the virtualization driver. At this point, the physical storage 220–228 is available for reuse in other virtual volumes 230–236.

In the event that virtualization is desired in other environments, such as the Access Controller (e.g. StoragTek SN6000)or a thin-server controller, this architecture is extensible to other platforms.

Referring to an Access Controller, for example, the management application may be used in total or in part on the management processor (MP) component of the Access Controller (AC). The MP is responsible for managing the AC configuration and downloading this information to the control processors on each of the interface cards. This is the same basic role the management application plays in the host-based virtualization architecture.

The virtualization driver code may be ported in part or in total to the port processors (PP) in the AC. The PP is responsible for accepting a host request and redirecting it to the appropriate port to which the physical device is attached. This is one of the primary roles of the virtualization driver in the host-based virtualization architecture.

For PPs that have physical storage devices attached to them, the device discovery code in the virtualization driver may be ported in part or in whole to the AC. Device discovery is a primary role of the virtualization driver in the host-based virtualization architecture.

Referring now to the thin server, some thin server (TS) architectures resemble a typical Unix server with Fibre Channel host bus adapters serving as either initiators or targets. In this case, the host-based architecture is again readily extensible to this platform.

The management application should be able to be ported in part or in whole to this platform serving the same function as it does in the host-based virtualization architecture. Its role is to manage allocation on the physical devices, provide an interface to the UI and to download configuration information to the virtualization driver.

The virtualization driver should be able to be ported in part or in whole to this architecture also. In fact, it would probably reside in exactly the same location in the driver call sequence and behave exactly as it does in the host-based virtualization architecture, routing a single host request to one or more physical devices.

Figure 3:
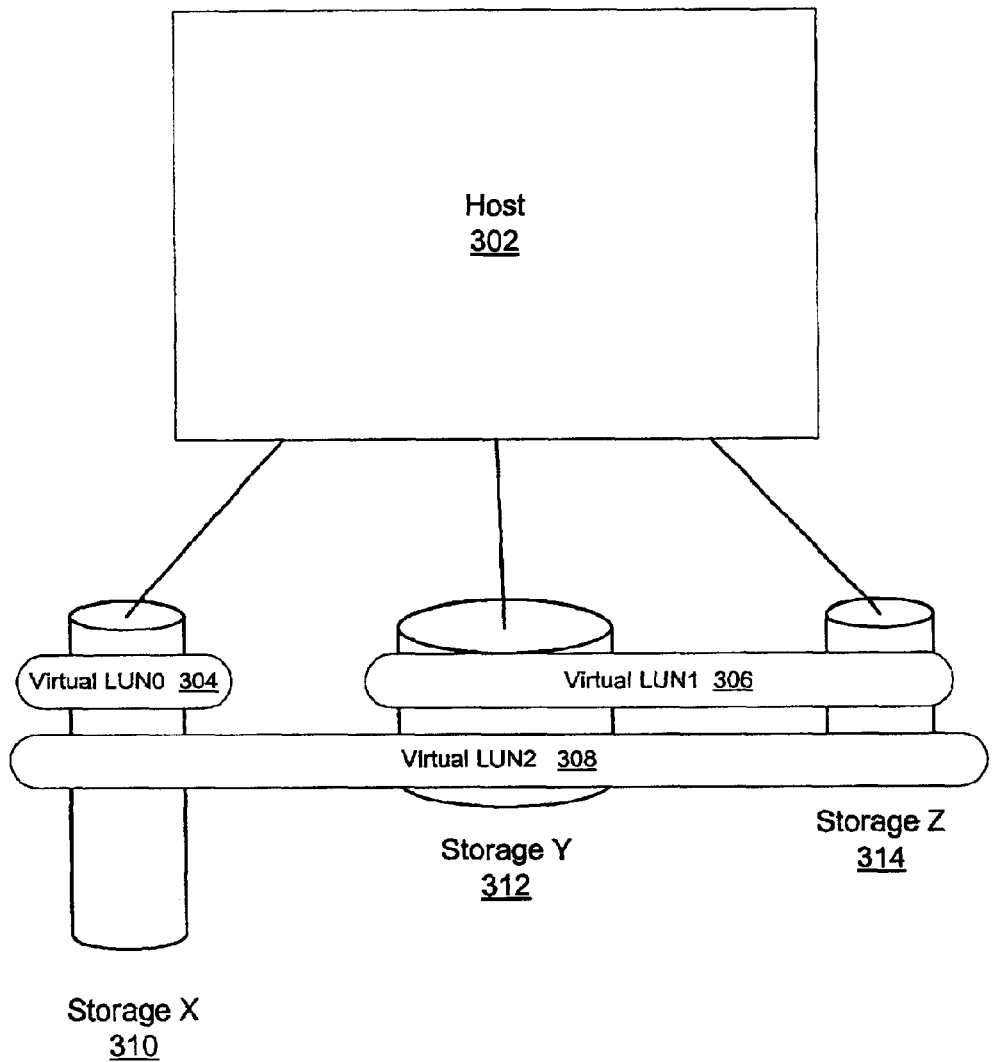
FIG. 3 depicts a block diagram illustrating a single host storage environment in accordance with a preferred embodiment of the present invention.

With reference now to FIG. 3, a block diagram illustrating a single host storage environment is depicted in accordance with a preferred embodiment of the present invention. In this example, the storage system includes a single host 302 with multiple storage devices 310–314 attached to it. Virtual devices 304–308 are created across various physical devices and presented to the host 302. This configuration supports various types of storage devices 310–314.

Figure 4:
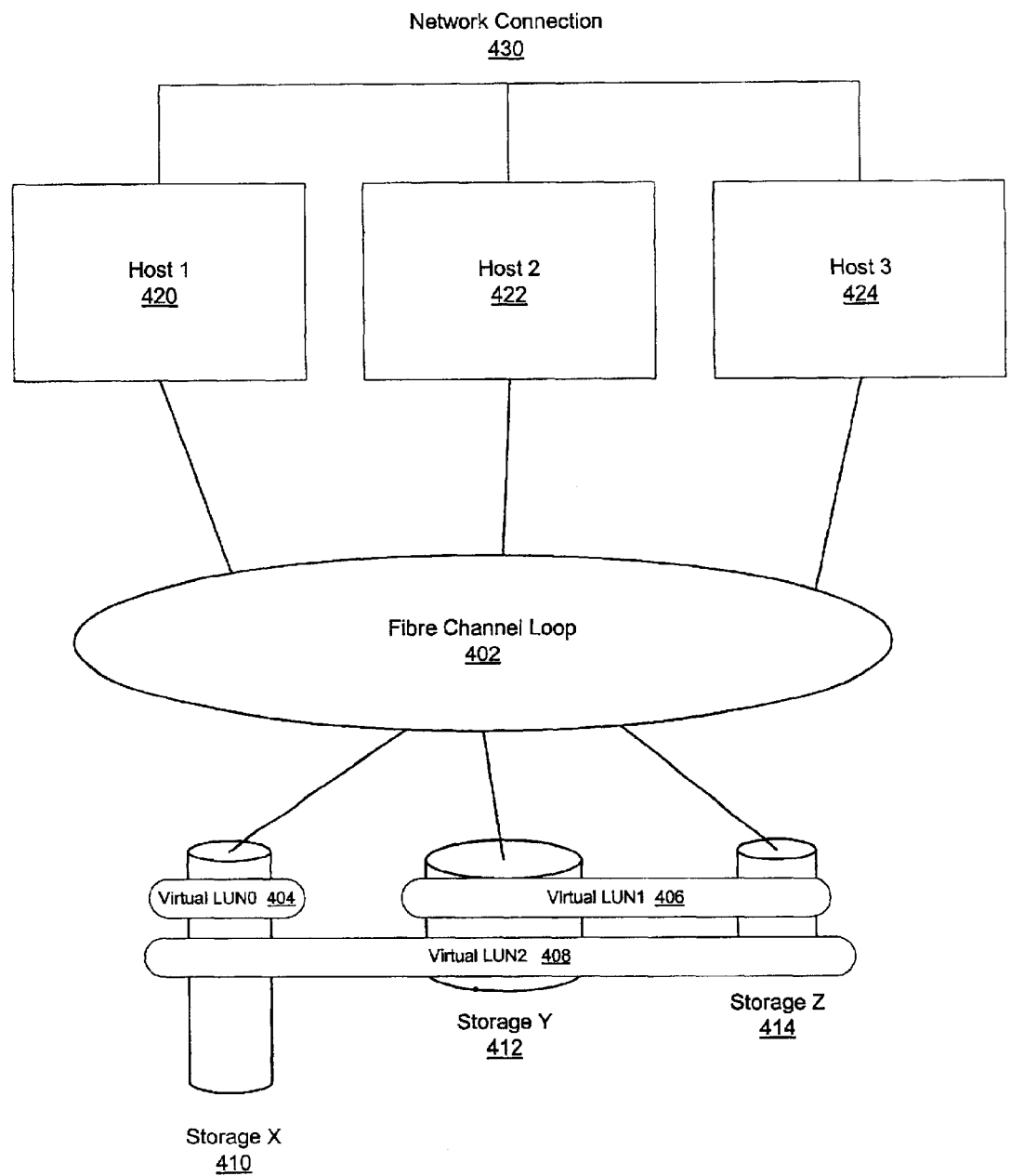
FIG. 4 depicts a block diagram of a multiple host storage system in accordance with a preferred embodiment of the present invention.

With reference now to FIG. 4, a block diagram of a multiple host storage system is depicted in accordance with a preferred embodiment of the present invention. In this example, the storage system includes multiple hosts 420–424 with multiple storage devices 410–414 attached to them through a fibre channel loop 402. Virtual devices 404–408 are created across various physical devices and presented to the hosts 420–424. This configuration supports various types of storage devices.

Each of the hosts 420–424 communicates virtual device configuration information through its network connection 430. The software components involved are described in detail below with reference to FIGS. 5 and 6. In this environment, one of the hosts 420 acts as a master, transmitting configuration information to each of the other hosts 422–424. The other hosts 422–424 act as slaves, receiving new information and applying it to the virtualization component of the system. In the event the master 420 fails, any of the slaves 422–424 may assume the role of the master. The configuration information is replicated on each of the hosts 420–424 in the environment.

The hosts 420–424 may be homogeneous hosts or heterogeneous hosts. If the hosts are heterogeneous hosts, host 1 420 may be, for example, a Solaris host, host 2 422 may be, for example, an NT host, and host 3 424 may be, for example, an HP-UX system.

Figure 5:
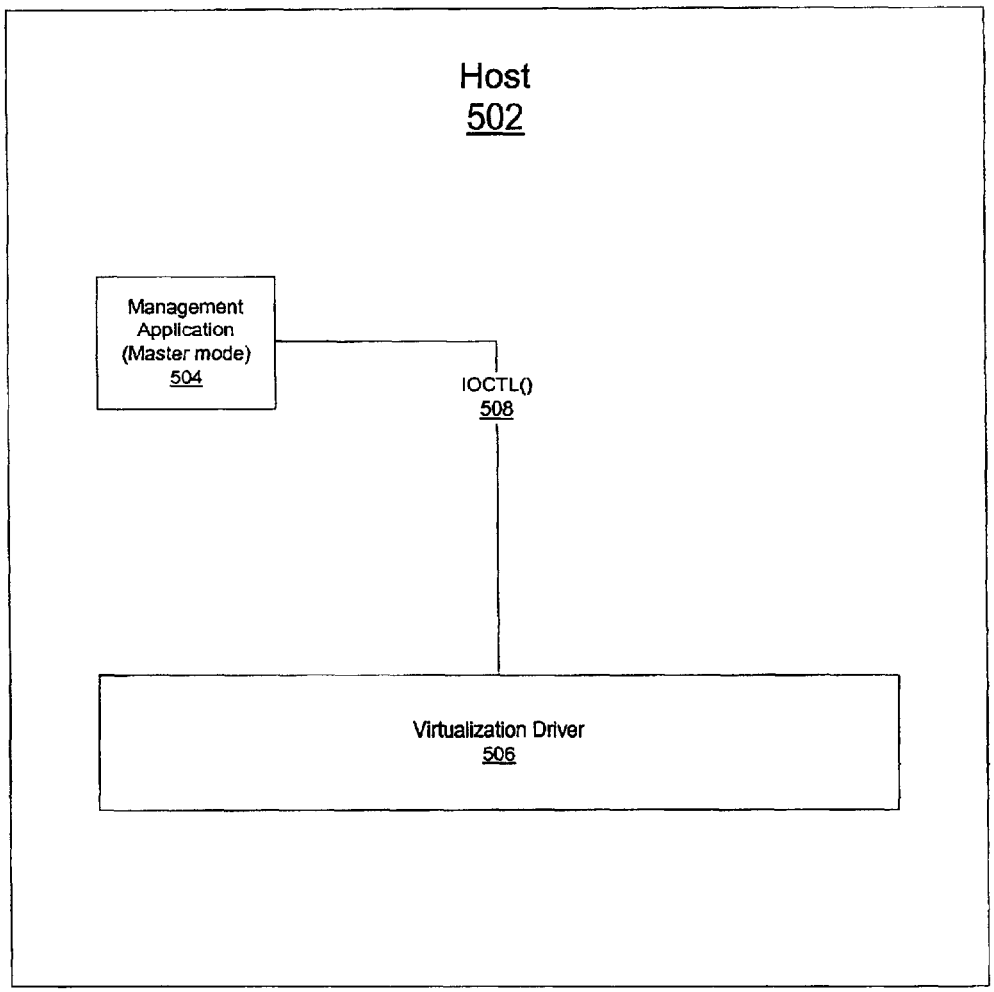
FIGS. 5 and 6 depict block diagrams illustrating the basic software components in both the single host mode and a multi-host mode in accordance with a preferred embodiment of the present invention.
Figure 6:
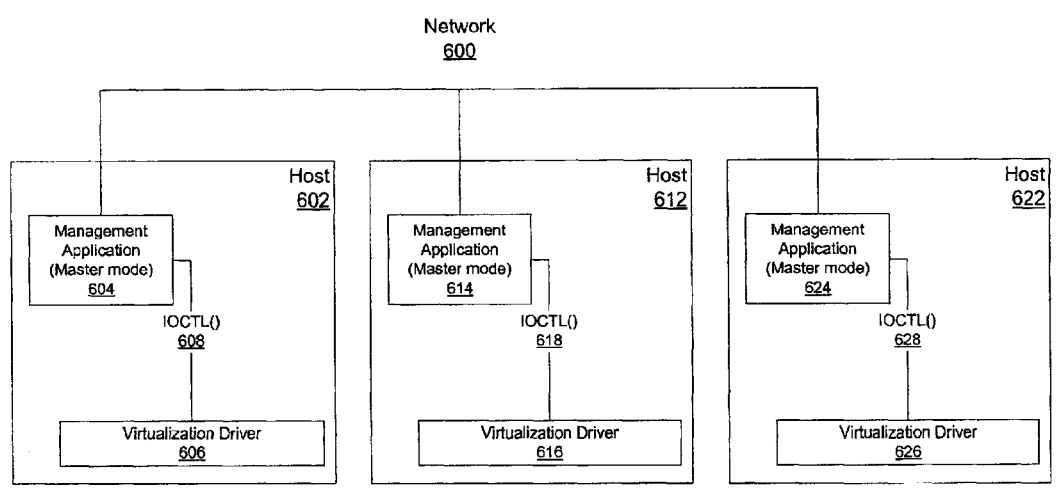

There are two primary software components in the host-based architecture. Each of the components resides on the host. FIGS. 5 and 6 depict block diagrams illustrating the basic software components in both the single host mode (FIG. 5) and a multi-host mode (FIG. 6) in accordance with a preferred embodiment of the present invention. Each host 502, 602, 612, and 622 has a management application 504, 604, 614, and 624 that runs in the user space as an application and communicates with the virtualization driver 506, 606, 616, and 626 running in kernel space. The two components 504, 604, 614, 624, 506, 606, 616, and 626 communicate to each other through the use of unique IOCTL 508, 608, 618, and 628 calls. Two basic types of IOCTL calls are supported in the depicted example. However, other types of IOCTL calls may be supported in other embodiments of the present invention. The first IOCTL call supported is a non-blocking call that the management applications 504, 604, 614, and 625 make to present new information and to make ad hoc queries. The second type of call is a blocking IOCTL that the management applications 504, 604, 614, and 625 makes to retrieve event information. This call is made by the management applications 504, 604, 614, and 625, blocking until the virtualization driver 506, 606, 616, and 626 has an event it needs to report up to the management applications 504, 604, 614, and 625.

Figure 7:
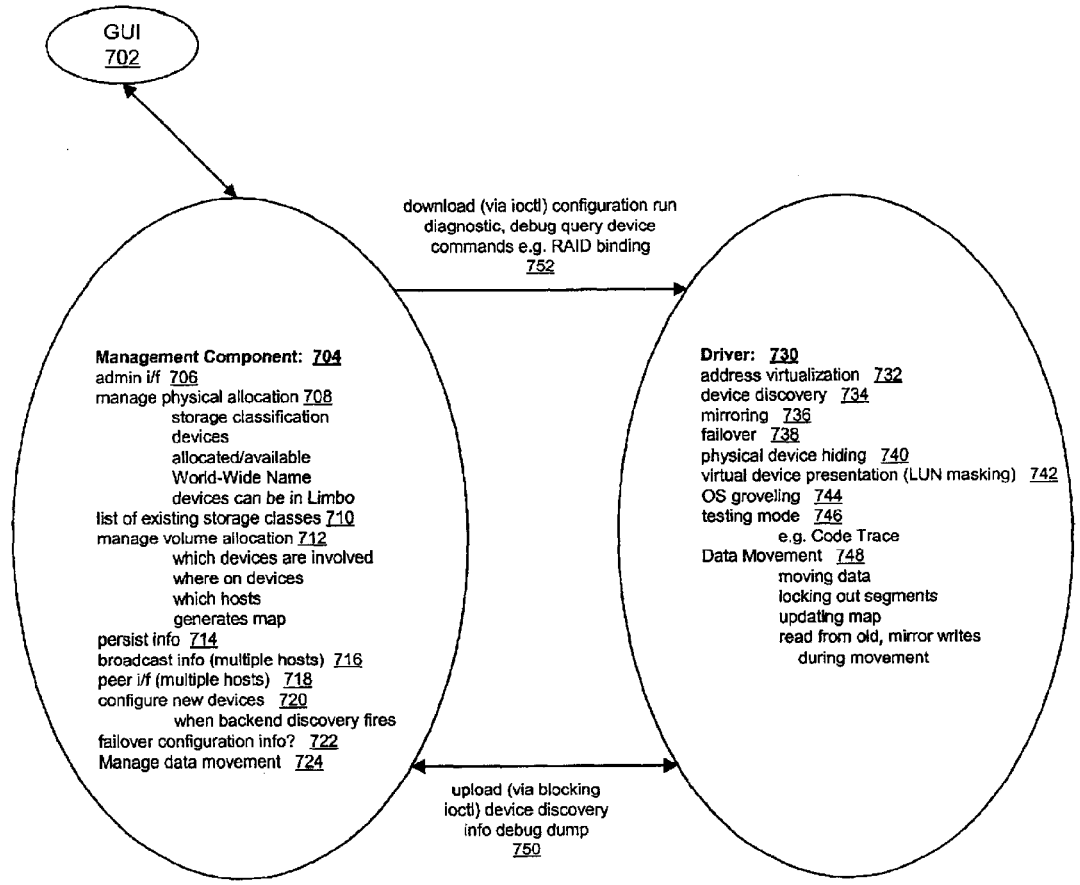
FIG. 7 depicts a block diagram illustrating the functionality of each component and the interfaces between the components of virtualization software in accordance with a preferred embodiment of the present invention.

With reference now to FIG. 7, a block diagram illustrating the functionality of each component and the interfaces between the components in virtualization software, such as, for example, any of virtualization software units 212–218 in FIG. 2, is depicted in accordance with a preferred embodiment of the present invention. The management application 704 is responsible for storing and manipulating the virtual configuration. All changes to the configuration are done through this component 704. This component 704 is not involved in the normal input output (IO) code path and is used relatively infrequently.

As depicted in FIG. 7, the management application 704 communicates to the Graphical User Interface (GUI) 702 through a well-defined interface. The GUI 702 is used only to present information provided by the management application 704 and as a tool to input information to the management application 704. The management application 704 is responsible for managing the actual device allocation received via upload of device discovery 750. This includes any expert system developed to determine the best fit for a virtual volume.

The management application 704 is also responsible for storing physical device information. This includes the type and size of each device attached to the environment. The management application 704 may be responsible for interpolating physical device information provided by the virtualization driver 730 into device classifications.

The following is a list and description of the functions provided by the management application 704. The administrative interface 706 is network based and allows for either a command line interface (CLI) or a GUI 702 to communicate with it. The protocol is text based and uses keywords to delineate the information being presented.

The management physical allocation function 708 provides that, as changes are made in the configuration of virtual devices (device are added, removed or modified), that the contents of the physical devices changes. Management of the free and allocated space on the physical device is done at this level. Other types of information maintained at this level include the worldwide name (WWN) of the devices and a list of devices not yet managed by this application or another.

The list of existing storage classes function 710 provides that as physical devices are discovered, they are classified by various parameters such as level of protection, performance, capacity, and possibly cost. These classifications are used to aid in the creation and placement of virtual volumes. This list is maintained by the application.

The manage volume allocation function 712 manages the information for each virtual volume. It contains information such as which physical devices are involved, whereon the devices the virtual volume resides, and to which hosts the virtual volume is presented. This function 712 also generates the mapping information for the volume. This mapping information is downloaded to the virtualization driver 730 for use in routing subsequent IO requests to the appropriate devices.

The persist information function 714 provides that, as changes are made to the configuration, either virtual or physical, the new configuration is saved to persistent storage on the same host as the application. This is true on each host in the environment. It may also prove beneficial to save the information on a host not participating in the virtualization environment. This information is recovered at system startup time and used to validate the physical configuration.

The broadcast information function 716 allows an application acting as the manager in a multi-host environment to broadcast configuration changes to all other hosts in the environment. There are at least two different methods by which this function 716 may be accomplished.

In one method, the management application 704 is divided into two separate processes, a server and a client. Each host has a client application running. The client is responsible for communicating with the virtualization driver 730 and persisting configuration information. The host acting as the master is also running a server process. This process is responsible for coordinating information to all of the clients.

In a second method, both the client and server logic are placed in a single process and cause the process to run as either a server or a client. In this case, each application, while having a dual personality, is the same.

The peer interface function 718 provides a communication interface between each of the management applications running in the environment. The configure new devices interface function 720 provides that, as new physical devices are discovered or old physical devices are removed, the management application is responsible for dealing with the changes. This includes any changes that may be required to the virtual configuration as the result of the physical change.

The failover configuration information function 722 provides that, in the event that the virtualization driver 730 also serves as a failover driver, the management application 704 will manage the failover configuration. For example, specifying the primary and alternate paths through which a virtual volume can be accessed.

The manage data movement function 724 provides that in the event that a virtual volume is redefined on different physical devices, that the management application is responsible for moving the data form one set of extents to another. This function 724 could also provide a data replication facility.

The virtualization driver 730 has two primary responsibilities, physical device discovery and IO redirection. Physical device discovery is performed at a minimum at system startup. However, it is desirable to be able to automatically detect new devices as they are attached to the hosts. This may be accomplished by recognizing that a Fibre Channel loop initialization process (LIP) has occurred and having the driver scan the loop for new devices.

IO redirection is accomplished through a series of tables and calculations. Table information is provided (downloaded) 752 by the management application 704. As the host makes requests to the virtual volumes, the driver 730 converts each host request into one or more physical device requests. The driver 730 then issues those requests and collects the individual completion statuses, presenting a single status to the host. The following is a list describing the functions provided by the virtualization driver 730.

The address virtualization function 732 provides the mapping function of the virtualization driver 730. It is responsible for converting a host IO request into one or more backend IO requests.

The device discovery function 734 is primarily run during system initialization (it may be run in the event that a fibre channel loop is reinitialized). It is responsible for probing the devices attached to this host and reporting those devices and their characteristics to the management application.

The mirroring (RAID 1) function 736 causes host write requests to be duplicated across two or more backend devices. It provides the same functionality as RAID1. At a minimum, writes are replicated and reads are sent to a single device. This function 736 may include reading from multiple devices and returning data when the first request completes as a performance enhancement.

The failover function 738 represents the ability to perform failover to another channel within the host. In the event that a path to a physical device is unavailable, the driver 730 selects an alternate path to the device and routes the IO down that path. This may require mimicking path failover drivers provided by various storage vendors.

The driver 730 is responsible for hiding physical devices from the host operating system. This function is provided by the physical device hiding function 740. Capturing host inquiry commands and data may accomplish this function 740. This is done to prevent the possibility of a physical device being managed simultaneously by the host operating system and the virtualization driver 730.

The virtual device presentation function (LUN masking) 742 allows the driver 730 to understand which virtual volumes are owned by which hosts. The driver 730 is then able to respond to host inquiry commands with virtual devices. This should allow the host to see only those virtual devices to which it has access.

The OS groveling function 744 refers to the unique work required to install a device driver in the normal driver call sequence.

Because the driver 730 is running in kernel space, debugging presents a challenge. Tools such as "print" statements can be useful, but greatly impact driver performance and thus may impact critical timing. The testing mode function 746, therefore, includes trace and dump facilities.

The data movement function 748 provides the ability to move data from one set of physical devices to another. This includes moving the data, locking access to particular segments, updating the map and mirroring writes during the movement. Much of the management information depicted here can be stored very low in the storage hierarchy including on the media that is being managed. When this media is removable, the management information can be moved to another system along with the data and the processing then can be elevated to the appropriate location(s) in the hierarchy for actual processing.

Figure 8:
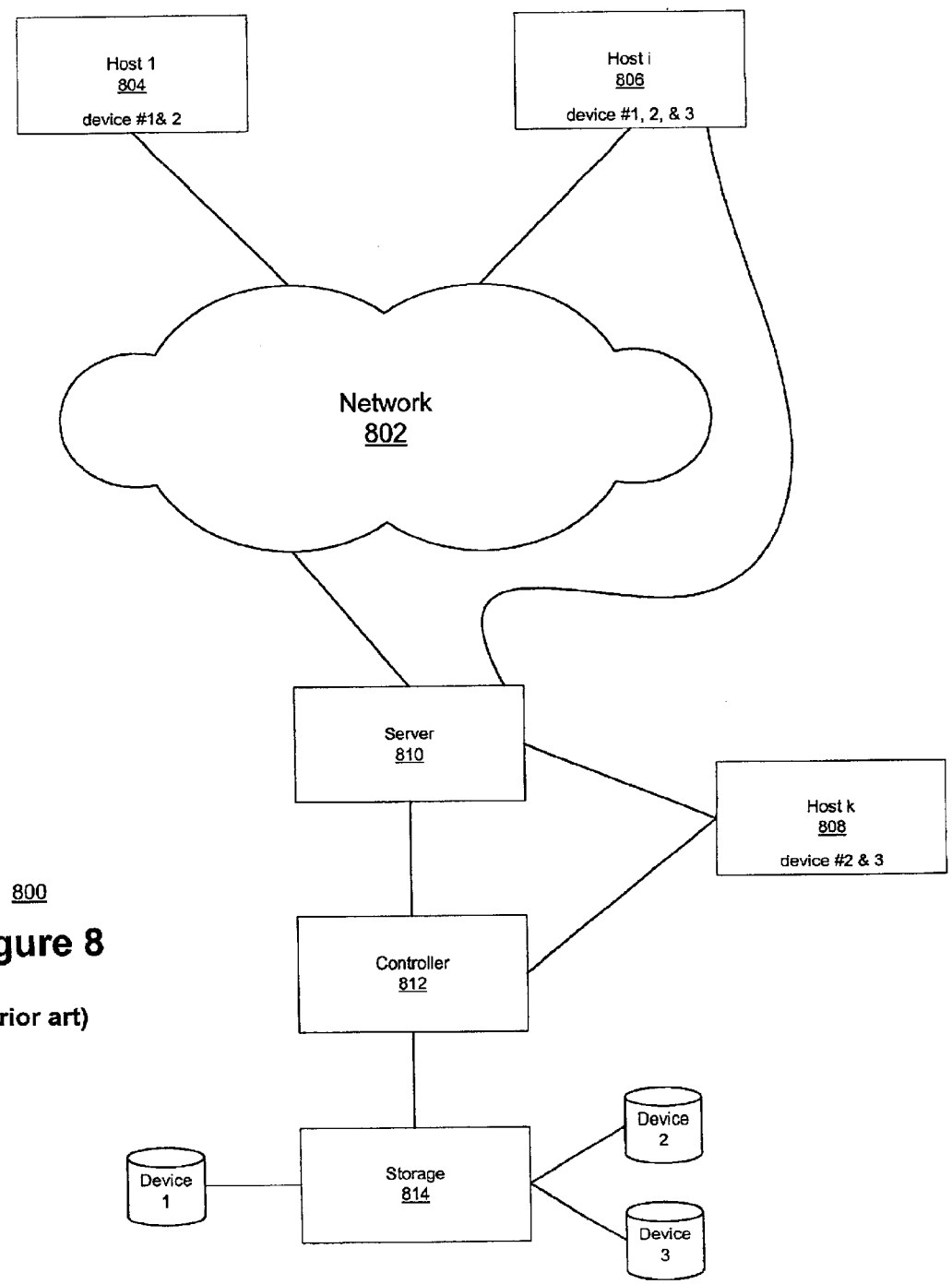
FIG. 8 depicts a block diagram illustrating a prior art method of storage virtualization.

With reference now to FIG. 8, a block diagram illustrating a prior art method of storage virtualization is depicted.

Storage system 800 includes hosts 804–808, network 802, server 810, controller 812, and storage 814. Host 1 804 and host i 806 are connected to storage 814 via network 802, which may be implemented as, for example, an SN6000 server, a product available from Storage Technology Corporation of Louisville, Colo. Host k 808 is functionally coupled to storage 814 through storage server 810 and controller 812.

With current storage management techniques, all the virtual devices (1, 2, 3) have level 1 resolution in the server 810. Device 1 has level 2 resolution in the storage server 810, and level 3 resolution in the storage controller 812. Device 2 has level 2 resolution in the storage server 810, and level 3 resolution in the storage controller 812. Device 3 has level 2 resolution in the storage controller 812, and level 3 resolution in the storage controller 812.

In the depicted example, current execution requires each host to contact the server 810 through any available path in order to initiate data transfer with any device since the server has level 1 resolution for every device. The server 810 will also do level 2 resolution for devices 1 and 2 but will pass the level 2 resolution for device 3 down to the storage controller 812. In all cases the level 3 resolution is passed from the server to the storage controller 812 and then data transfer can proceed. The server 810 function is actually software executed on Host 808 which therefore has a direct connect in to the storage controller 812. However, since the level 1 resolution must go through the server 810, the data must also be routed through the server 810 and then be transferred from the server 810 to the host k 808 via a memory to memory transfer.

The problem with the current method is that if, for example, the storage controller 812 is saturated (overloaded) or the storage server 810 storage controller 812 path is too busy or the storage server 810 on the host k 808 is too busy, then all hosts using devices 1, 2, and 3 will have delays in getting to their data and the system performance will be poor.

Figure 9:
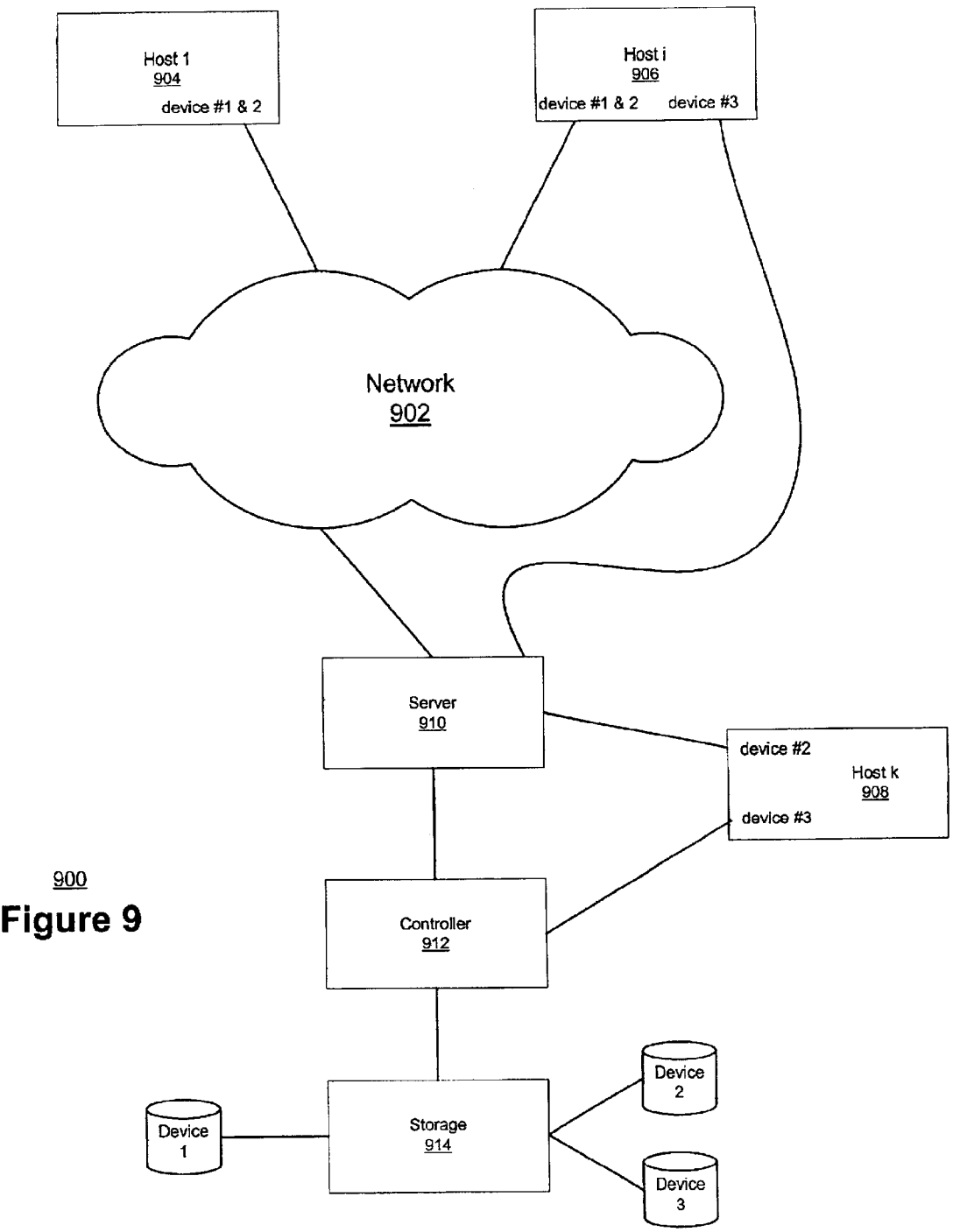
FIG. 9 depicts a block diagram illustrating a storage virtualization system in accordance with a preferred embodiment of the present invention.

With reference to FIG. 9, a block diagram illustrating a storage virtualization system is depicted in accordance with a preferred embodiment of the present invention. System 900 includes similar components to system 800 including hosts 904–908, network 902, storage server 910, storage controller 912, and storage 914. However, to solve the problem described above of the overload of key processing units or transfer paths, the level 1, 2, and 3 processing is moved at the request of a host or as a consequence of internal processes that note the contention to more strategic locations. Since Host 1 904 and Host i 906 have access to the network 902, moving level 1 and level 2 resolution for devices 1 and replicating level 1 and level 2 resolutions for device 2 to the network 902 from the server 910 (which is actually using the processor in Host k 908) will significantly relieve the load on the server 910. Also moving the level 1 resolution for device 3 from the server 910 to the controller 914 will allow the transfer for device 3 to Host k 908 to go directly rather than through the server 910. The level 1 resolution for device 2 is also maintained in the server 910 for requests that do not go through the network 902. When Host 1 904 does data transfer with device 1 or device 2, the processing of level 1 and level 2 is done at a node in the network 902, the processing of the level 3 is passed through the server 910 to a node in the controller 912 and data flows from a node in storage 914 through the server 910 and the network 902 to the Host 1 904. When Host i 906 does transfer with device 1 or 2 it follows the same process. When Host i 906 accesses device 2 but finds the network busy or when host k 908 wishes to initiate transfer to device 2, the level 1 and level 2 resolution is processed at a node in the server 910 and communication is made with the network 902 to keep the processing of level 1 and level 2 for device 2 consistent between the two locations. When host i 906 wishes to initiate data transfer with device 3, it does so using whichever path to server 910 is less busy at the moment. The processing of level 1, level 2, and level 3 are all executed at anode in the controller 912 and transfer is initiated through the server 910 with Host i 906. When Host k 908 initiates transfer with device 3, the request is sent directly to a node in the controller 912 and transfer is initiated from device 3 through storage 914 and then directly between the controller 912 and Host k 908.

The fact that the processing for various levels and devices have been moved or replicated is discovered by the system as accessing requests are made. When a request utilizes the resources where the processing is now done, the discovery is defacto. When the request goes through a resource that no longer does the processing, the discovery is indirect. If Host k 908 were to make a request to initiate transfer with device 1 and sent that request to the server, the server would be aware of the current location of device 1 processing (i.e. the network 902) and would route the initial processing to the network 902. Then the final level 3 processing would be passed from the server 910 down to the controller 912. The data transfer between device 3 and Host k 908 would flow through the storage 914, the controller 912 and the server 910. Thus we see that moving the processing for some devices and replicating some of the processing for some devices will allow a system to distribute the workload more evenly and improve system performance.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. For example, although the volumes in the examples are virtual volumes, the processes of the present invention also may be applied to physical volumes. The embodiment was chosen and described in order to best explain the principles of the invention, the practical application, and to enable others of ordinary skill in the art to understand the invention for various embodiments with various modifications as are suited to the particular use contemplated.

What is claimed is:

1. A virtual stored data management system, the virtual stored data management system comprising:
   one or more hosts;
   a plurality of data storage elements functionally coupled to the one or more hosts, wherein the plurality of data storage elements include a host network attachment, a data transfer system, at least one of a storage server and a controller, and a permanent data storage media, wherein the permanent data storage media is organized with management information uniquely associated with units of data such that the management information may be manipulated at nodes that are in a plurality of different locations within the virtual stored data management system substantially simultaneously; and virtualization means for converting a storage request to a virtual volume into a storage request to at least one data storage element of said plurality of data storage elements.

2. The virtual stored data management system as recited in claim 1, wherein manipulation of the data comprises allowing an internal process to discover a current location of a data processing function.

3. The virtual stored data management system as recited in claim 1, wherein manipulation of the management information comprises allowing the location of the manipulation of said management information to be changed as directed by a host.

4. The virtual stored data management system as recited in claim 1, wherein manipulation of the management information comprises allowing the location of the manipulation of said management information to be changed as directed by internal process.

5. The virtual stored data management system as recited in claim 1, wherein manipulation of the management information comprises allowing the location of the manipulation of said management information to be replicated as directed by a host.

6. The virtual stored data management system as recited in claim 1, wherein manipulation of the management information comprises allowing the location of the manipulation of said management information to be replicated as directed by internal process.

7. The virtual stored data management system as recited in claim 1, wherein manipulation of the management information comprises allowing for processing of the management information to be held consistent when completed in more than one place substantially simultaneously.

8. The virtual stored data management system as recited in claim 1, wherein at least part of the management information manipulation is performed at a node that is located in a connecting network.

9. The virtual stored data management system as recited in claim 1, wherein at least part of the management information manipulation is performed at a node that is located in a storage server.

10. The virtual stored data management system as recited in claim 1, wherein at least part of the management information manipulation is performed at a node that is located in a storage controller.

11. The virtual stored data management system as recited in claim 1, wherein at least part of the management information manipulation is performed at a node that is located in a storage element.

12. The virtual stored data management system as recited in claim 1, wherein at least part of the management information associated with units of data is stored at a node that is located in the permanent data storage media.

13. The virtual stored data management system as recited in claim 12, wherein the permanent data storage media includes robotically controlled removable media.

14. The virtual stored data management system as recited in claim 12, wherein the permanent data storage media includes a newly acquired removable media.

15. The virtual stored data management system as recited in claim 1, further comprising:

discovery means for discovering one or more of the plurality of data storage elements.

16. The virtual stored data management system as recited in claim 15, wherein the discovery means work in parallel with management information processing.

17. The virtual stored data management system as recited in claim 1, wherein the manipulation of the management information comprises a change of location.

18. The virtual stored data management system as recited in claim 17, wherein the change of location includes a promotion toward a using host.

19. The virtual stored data management system as recited in claim 17, wherein the change of location includes a demotion further from a using host.

20. The virtual stored data management system as recited in claim 1, further comprising:

simultaneous processing of the management information at different layers of the virtual stored data management system.

21. The virtual stored data management system as recited in claim 1, further comprising:

simultaneous processing of the management information at different units at the same layer of the virtual stored data management system.

22. The virtual stored data management system as recited in claim 21, further comprising:

simultaneous processing of the management information at different layers and different units of the virtual stored data management system.

* * * * *